March 15, 1927.                                                1,621,433
C. H. H. RODANET
CONTROL FOR SPEED INDICATORS OR THE LIKE BY ONE OF THE STEERING
WHEELS OF A MOTOR VEHICLE
Filed May 4, 1925
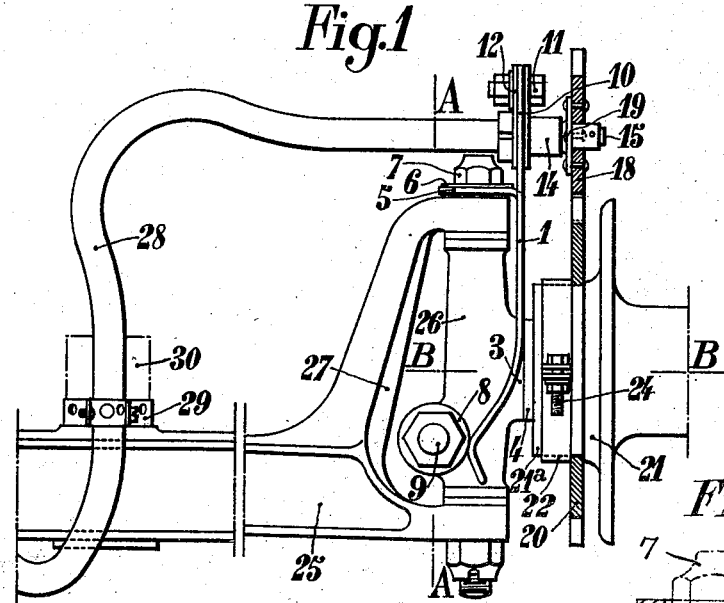
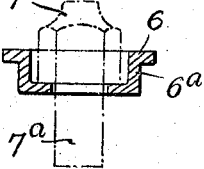
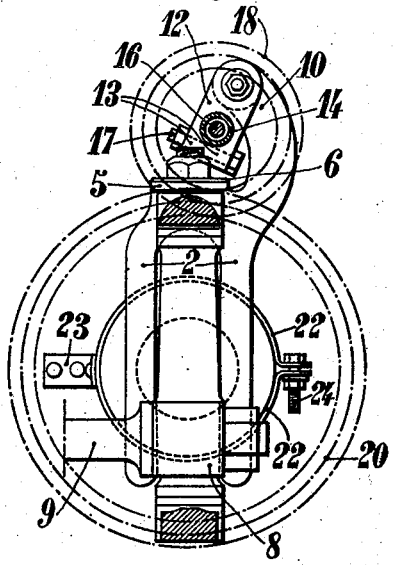
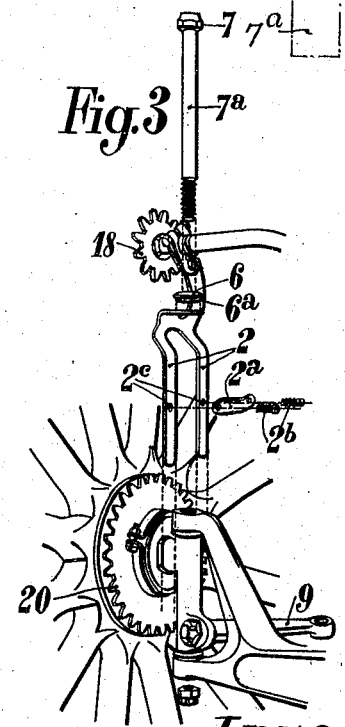
Inventor
C. H. H. Rodanet
By Marks & Clerk
Attys.

Patented Mar. 15, 1927.

1,621,433

UNITED STATES PATENT OFFICE.

CHARLES HILAIRE HENRI RODANET, OF VERSAILLES, FRANCE, ASSIGNOR TO ETABLISSEMENTS ED. JAEGER, OF PARIS, FRANCE, A FRENCH COMPANY.

CONTROL FOR SPEED INDICATORS OR THE LIKE BY ONE OF THE STEERING WHEELS OF A MOTOR VEHICLE.

Application filed May 4, 1925, Serial No. 27,981, and in France February 18, 1925.

The present invention relates to a device allowing to couple the flexible transmission of a speed indicator, or other apparatus, with one of the steering wheels of a motor vehicle.

This device, which can be adapted without essential modifications on the front axle of motor vehicles, and more particularly on Ford motor cars, is characterized in that the angular connection between the flexible transmission and the steering wheel is effected by means of two gears one of which is rigidly secured on the hub of the wheel and the other on the flexible transmission supported for that purpose in a bearing capable of pivoting relatively to a frame which is secured on the steering swivel of the wheel so as to participate to all the changes of direction of the latter, the pivoting axis of the end bearing of the flexible transmission being substantially constantly parallel to the axis of the steering swivel of the steering wheel.

The accompanying drawing, somewhat diagrammatic, illustrates by way of example only a form of construction of a driving device such as above characterized.

Fig. 1 shows, in elevation, the end of a steering axle provided with the driving device.

Fig. 2 is a cross section according to A—A of Fig. 1.

Fig. 3 is a perspective view at a reduced scale showing separately the various elements of the device.

Fig. 4 is a sectional detail view of the cup.

The device essentially comprises a frame 1, preferably made of sheet-iron so cut out and shaped as to present two branches 2, which embrace the rear part 3 of the steering swivel 4 of the steering wheel and a perforated sole piece 5 which is mounted on an outer bearing portion 6ª of a cup 6 (Fig. 3) locked by the head 7 of the pivoting axis 7ª of the said steering swivel 4.

The end of each of the branches 2 of the frame 1 bears, somewhat resiliently, on the boss 8 which receives the end of the lever 9 ensuring the changes of direction of the wheel. Thus secured, the frame 1 participates to all the displacements of the steering swivel 4 about the pivoting axis of the wheel. The fixing in position of the frame 1 can be strengthened as shown in Fig. 3, by a yoke 2ª which embraces the portion 26 of the steering swivel and is secured by screws 2ᵇ on the branches 2 perforated with screw threaded holes 2ᶜ for that purpose. This fixing in position will be (preferably) particularly adapted in case the device is applied to a steering swivel for a low chassis, as is the case for Fig. 3.

At its upper part, the frame 1 is provided with an arm 10, on which is pivoted, about an axis constituted by the bolt 11, a support 12 which can be easily constituted of cut out and bended sheet-iron presenting two cheeks fitting on the side faces of the arm 10 and two resiliently distortable nose pieces 13, between which is locked, by means of a bolt 17, a bearing-socket 14 for a shaft 15 angularly connected to the flexible transmission 16. This shaft 15 carries, at its end external to the socket 14, a pinion 18, which can be made for instance of plastic material and is secured on the shaft 15 by its metal hub 19. The bolt 11 allows to lock the member 12 in any angular chosen position.

A second gear 20 is rigidly secured on the hub 21 of the steering wheel and ensures the drive of the pinion 18. This gear 20 is, for instance, cut in a metal disc, and is secured on a bearing portion 21ª of the hub 21 by means of a distortable collar 22 angularly secured on the gear 20, by means of an angle bracket 23, riveted both on the gear and the collar, or any other equivalent means.

The ends of the collar receive a bolt 24, which allows to lock the gear 20 on the hub 21 of the wheel, by arranging it in the same plane as the pinion 18. It will be seen that, owing to the support which can be set about the bolt, it is always possible to obtain suitable gearing conditions of the gear 20 and of the pinion 18, according to the height of the axis B—B relatively to the axle 25.

The sheath 28 of the flexible transmission, is for instance, secured on the axle 25 by means of an universal collar 29, which is attached on the base of the fork piece 30, to which is secured the end of the suspension spring of the axle.

It will be seen that the driving conditions of the flexible transmission are not influsteering wheel since the gear 20 and the pinion 18 constantly remain in the same plane.

What I claim as my invention and desire to secure by Letters Patent is:

1. In a driving mechanism for the flexible shaft of a speedometer in subsequent connection with the steering wheel of an automobile, a gear, means for fixing the said gear upon a bearing of the hub of a steering wheel, a pinion keyed on the end of the flexible shaft of the speedometer, a sleeve for supporting the end of said flexible shaft near such pinion, a support for said sleeve, a frame provided with a branch disposed parallel to the plane of the gear, an axle for connecting pivotally the support of the pinion to the upper end of said branch of the frame, an ear arranged perpendicularly to the end of said frame, a cup serving as the axle of rotation of said ear and centrally perforated for the passage of the pivotal axle of the wheel whose head serves as fixing means for the said cup on the axle.

2. In a driving mechanism for the flexible shaft of a speedometer in subsequent connection with the steering wheel of an automobile, a gear, a collar fixed on said gear, means for clamping said collar and consequently said gear on a bearing of the hub of the steering wheel, a pinion fixed on the end of the flexible shaft of the speedometer, a sleeve to hold the end of said flexible shaft near said pinion, a support provided with two jaws for locking said sleeve, means for clamping or releasing said jaws, a sheet metal frame provided with two branches embracing the journal of the steering wheel and with one upper branch disposed parallelly to the plane of the gear fixed on the steering wheel, a bolt serving as pivot joint axle, an ear extending angularly from said upper branch, a cup serving as pivotal axle for said ear and perforated for the passage of the pivotal axle of the wheel, the head of said axle serving for fixing the said cup on the axle, substantially as and for the purposes set forth.

In testimony whereof I have signed my name to this specification.

CHARLES HILAIRE HENRI RODANET.